United States Patent [19]

Ineson

[11] Patent Number: 4,955,777
[45] Date of Patent: Sep. 11, 1990

[54] AIRCRAFT GROUND HANDLING TRACTOR

[75] Inventor: Malcolm P. Ineson, Cheltenham, Great Britain

[73] Assignee: M L Douglas Equipment Ltd, Cheltenham, Great Britain

[21] Appl. No.: 328,540

[22] Filed: Mar. 24, 1989

[30] Foreign Application Priority Data

Mar. 29, 1988 [GB] United Kingdom ............... 8807492

[51] Int. Cl.$^5$ .......................... B64F 1/22; B60P 1/54; B60D 7/00
[52] U.S. Cl. ................................ 414/426; 180/904; 212/155; 212/182; 244/50; 280/402; 280/491.2; 414/563; 414/728
[58] Field of Search ............... 414/563, 562, 561, 560, 414/426, 427, 428, 429, 920, 680, 728; 212/182, 160, 153, 155, 254; 244/50; 180/904; 280/402, 480.1, 491.1, 491.2, 491.3

[56] References Cited

U.S. PATENT DOCUMENTS

| 2,877,911 | 3/1959 | Arnot ................................ 414/428 |
| 2,919,933 | 1/1960 | Olson ............................... 244/50 X |
| 3,649,048 | 3/1972 | Garnett ......................... 280/491.3 X |
| 3,709,522 | 1/1973 | Olson .............................. 180/904 X |
| 3,719,294 | 3/1973 | Aquila .......................... 280/402 X |
| 3,868,128 | 2/1975 | Mahieu ......................... 180/904 X |
| 4,057,158 | 11/1977 | Lissy ............................. 244/50 X |
| 4,113,041 | 9/1978 | Birkeholm ...................... 244/50 X |
| 4,178,591 | 12/1979 | Geppert ....................... 212/155 X |
| 4,185,280 | 1/1980 | Wilhelm ....................... 212/155 X |
| 4,566,599 | 1/1986 | Villa et al. ...................... 212/160 |
| 4,632,625 | 12/1986 | Schuller et al. ................ 414/429 |
| 4,658,924 | 4/1987 | Dobbie ......................... 414/426 X |
| 4,799,850 | 1/1989 | Petitto, Sr. et al. ........... 414/728 X |

FOREIGN PATENT DOCUMENTS

| 3302771 A1 | 8/1984 | Fed. Rep. of Germany. |
| 3642044 | 6/1988 | Fed. Rep. of Germany ........ 244/50 |
| 793832 | 3/1981 | U.S.S.R. .......................... 280/402 |

Primary Examiner—Robert J. Spar
Assistant Examiner—Robert S. Katz
Attorney, Agent, or Firm—Nixon & Vanderhye

[57] ABSTRACT

An aircraft ground handling tractor (1) includes a manoeuverable boom (6) mounted on it. The free end of the manoeuverable boom (6) includes a connector (18) capable of being connected to an aircraft nosewheel assembly so that the tractor (1) can be connected to the nosewheel assembly through the boom (6) to enable it to pull or push the aircraft. The manoeuverable boom (6) is retractable completely within the outer limits of the tractor (1) so that, when the tractor (1) is not pulling an aircraft the manoeuverable boom (6) is wholly retracted so that it is protected from damage. Preferably the tractor (1) includes a longitudinal tunnel (7), and the manoeuverable boom (6) is received within this tunnel (7) in its retracted position. Preferably the movement functions of the boom (6) are all powered and all controlled from a driving cab (2) of the ground handling tractor (1), and the tractor (1) includes a separate, hand held control unit which enables them to be controlled remotely from the driving cab. Preferably the manoeuverable boom (6) includes load sensors to monitor the thrust and any turning torque applied by the boom to the aircraft nosewheel assembly and a control system which compares the output of the load sensors with predetermined limits based on the type of aircraft being handled and which provides a warning if the loads applied through the boom (6) to the aircraft exceed predetermined limits.

15 Claims, 9 Drawing Sheets

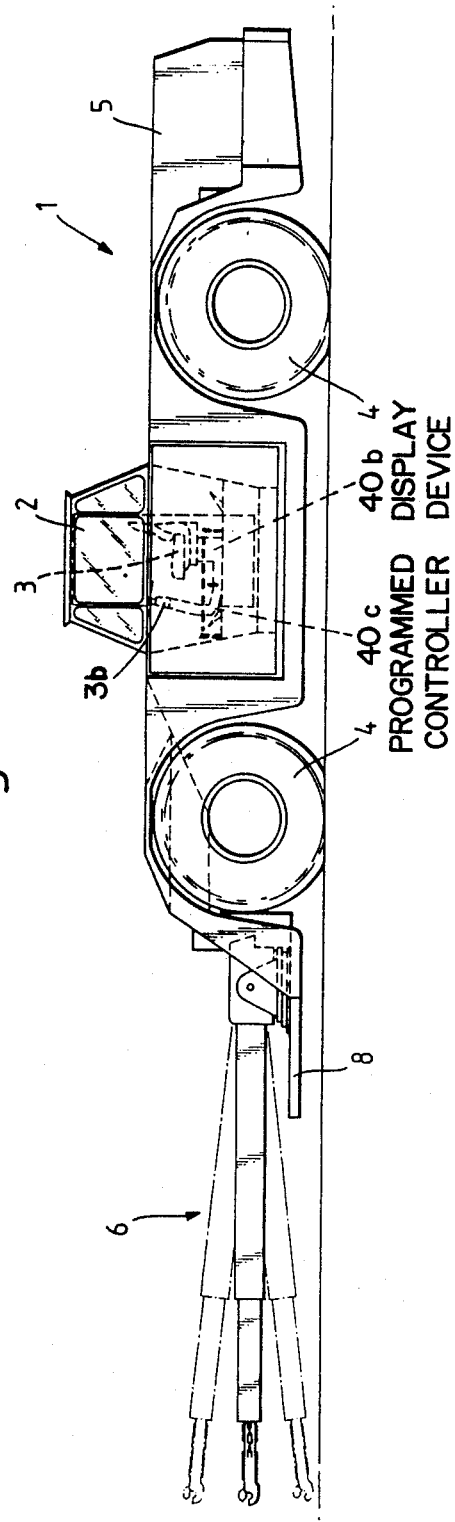
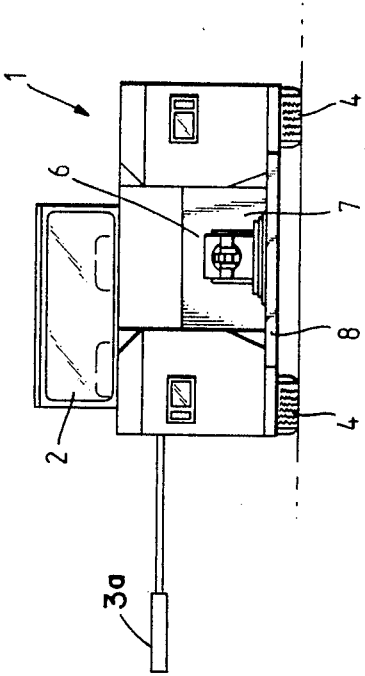

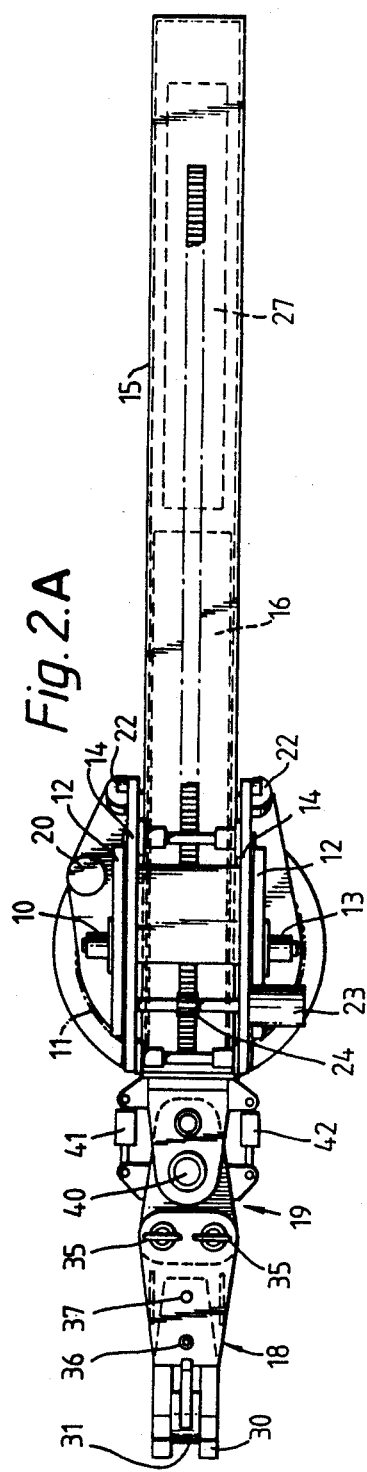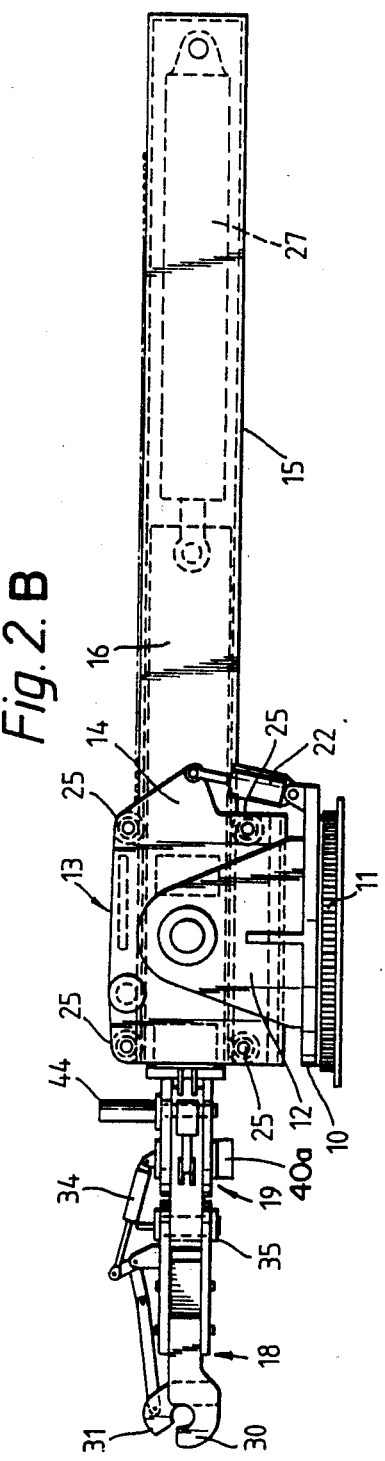

Fig. 3.A
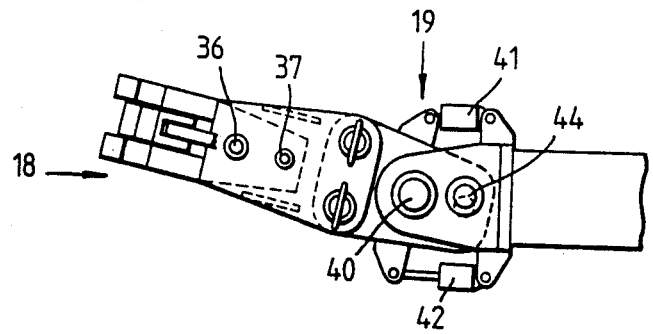
Fig. 3.B
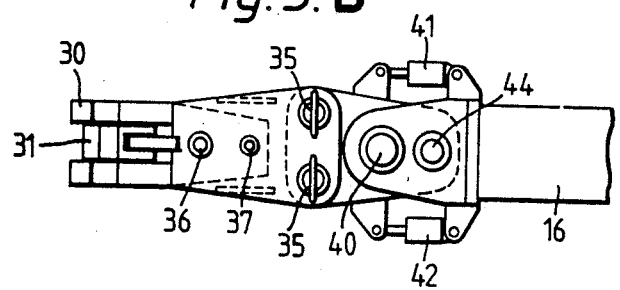
Fig. 3.C
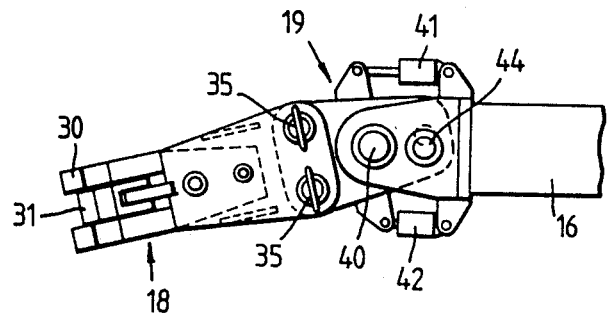

Fig. 4. A
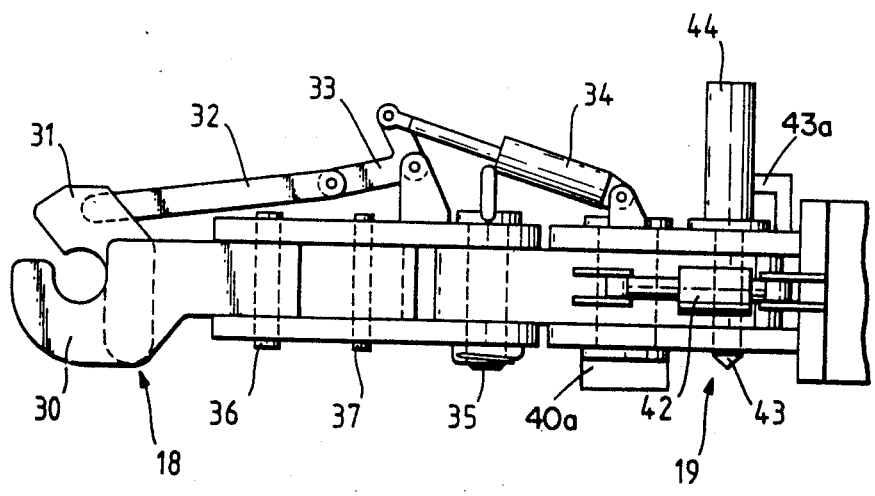
Fig. 4. B
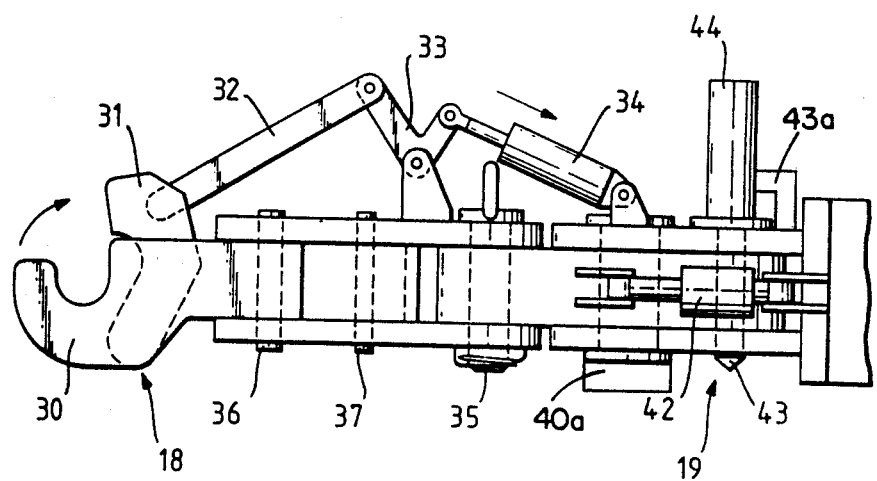

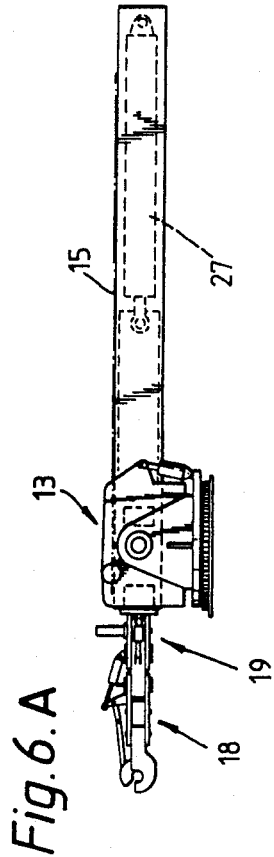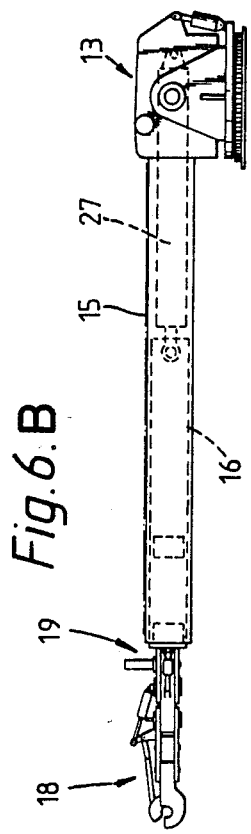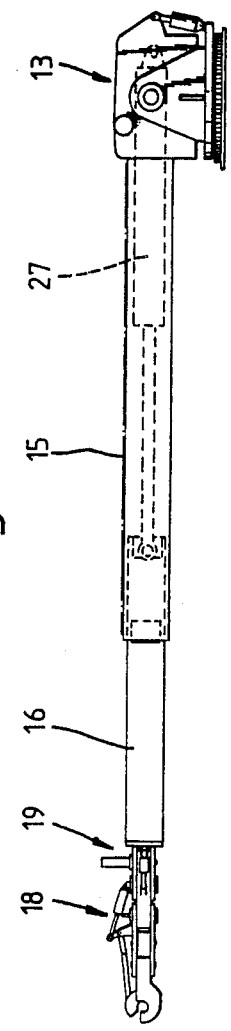
Fig.6.A Fig.6.B Fig.6.C

Fig. 7. A
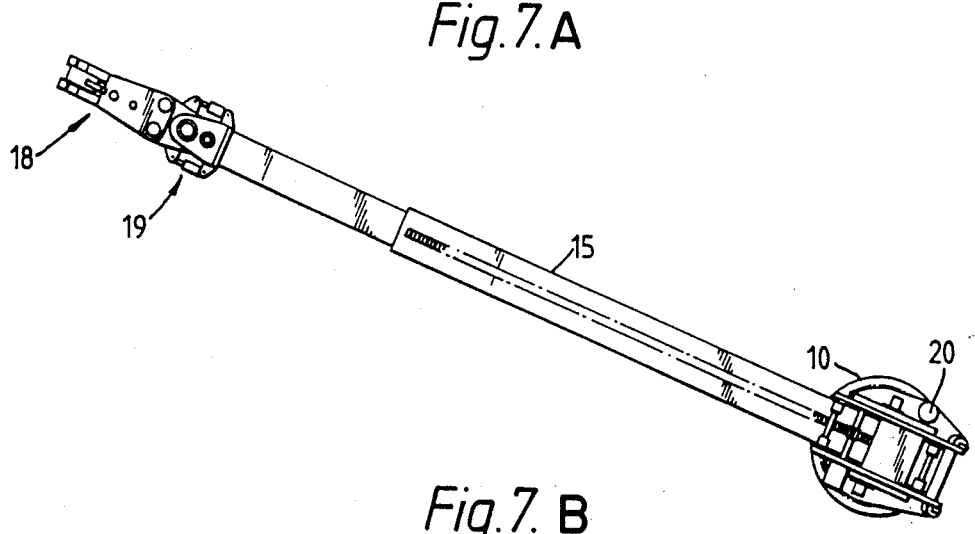
Fig. 7. B
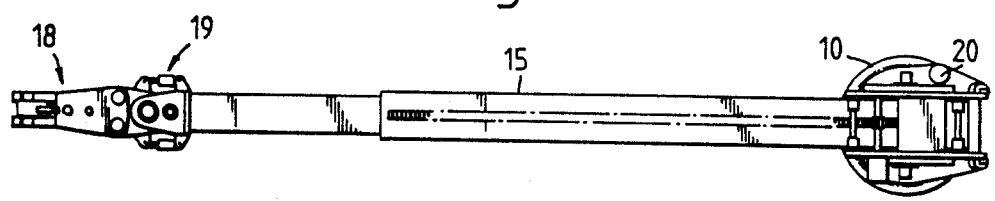
Fig. 7. C
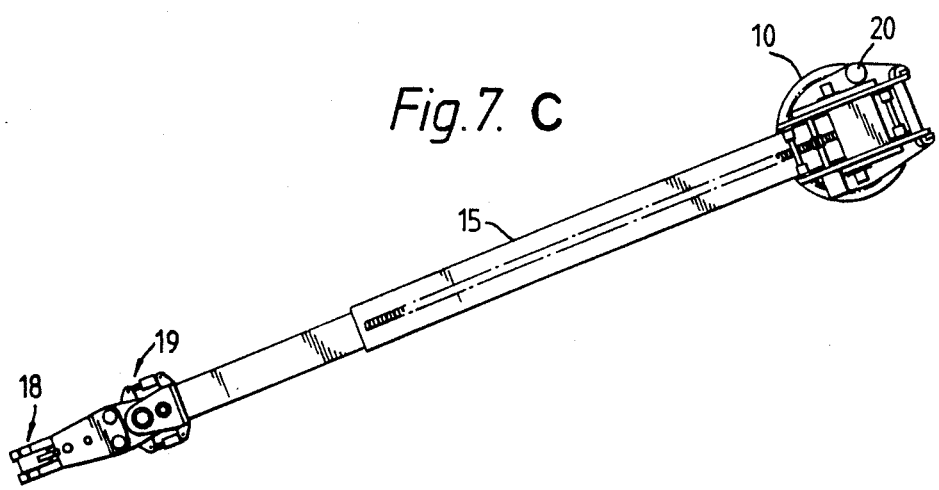

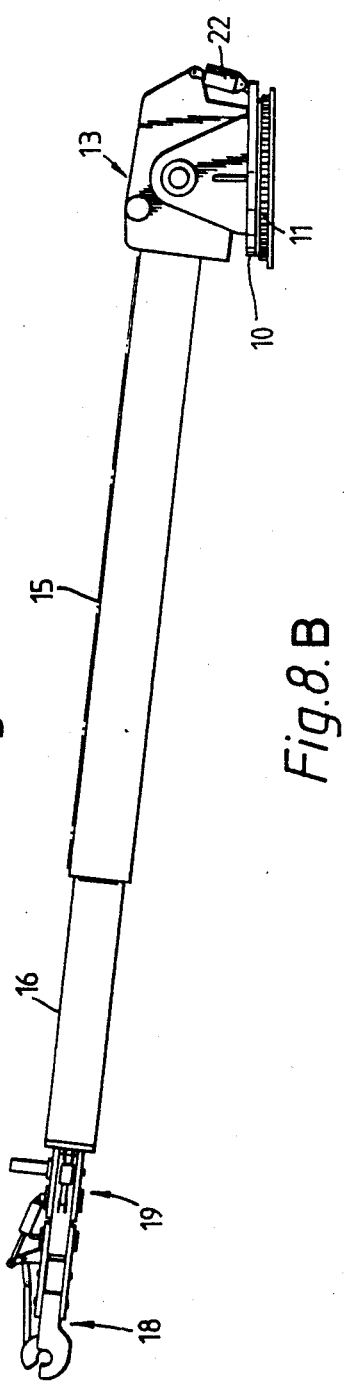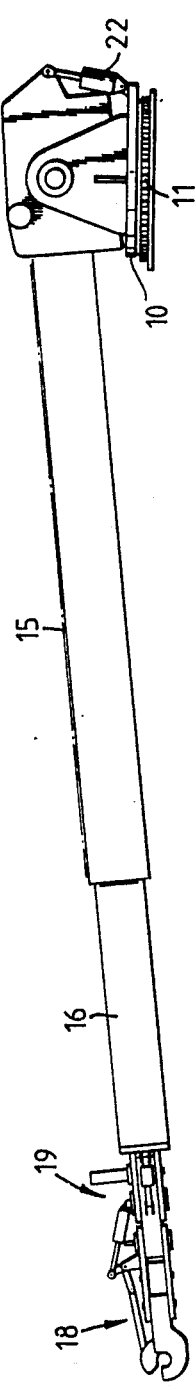

AIRCRAFT GROUND HANDLING TRACTOR

BACKGROUND OF THE INVENTION

When manoeuvring aircraft on the ground for example moving aircraft in and between cargo and passenger loading and unloading bays, maintenance bays and parking and refuelling areas it is usual to move the aircraft with an aircraft ground handling tractor. Such tractors are connected to the nosewheel assembly of the aircraft by a rigid tow-bar and the tractor can then push or pull the aircraft to manoeuvre it into its required location.

As the size of aircraft has increased so the size of tow-bar and the size and power of the tractor has increased. Nowadays most tow-bars include a pair of wheels connected to the tow-bar through a hydraulic jack assembly so that, when not connected to an aircraft the tow-bar can be towed on its wheels by the ground handling tractor. Upon being manoeuvred into position adjacent the nosewheel assembly of the aircraft the hydraulic jacking mechanism is then operated to raise the free end of the tow-bar to the correct height to enable a connector located at its free end to be connected to the nosewheel assembly of the aircraft. Once it has been connected the hydraulic jack is then operated to lift the wheels of the tow-bar off the ground so that the tow-bar is supported between the ground handling tractor and the nosewheel assembly of the aircraft.

The connection between the tow-bar and the nosewheel assembly of the aircraft are often different from one aircraft type to another and, whilst some attempts have been made to standardise the nature of the connector it is often located at a different height above the ground for each aircraft type. Accordingly, even where the connectors at the end of the tow-bar can be used for more than one type of aircraft the height to which the free end of the tow-bar has to be lifted varies between aircraft of different type. Accordingly, most airports have a wide range of tow-bars and, whilst in general, all of the tow-bars can be used with any of the ground handling tractors, individual tow-bars are used exclusively with aircraft of a particular type.

DE-A-3302771 describes a proposal for an aircraft ground handling tractor which includes a manoeuvrable boom mounted on it, the free end of the manoeuvrable boom having a connector capable of being connected to an aircraft nosewheel assembly so that the tractor can be connected to the nosewheel assembly through the boom to enable it to pull or push the aircraft.

SUMMARY OF THE INVENTION

According to this invention such an aircraft ground handling tractor has its manoeuvrable boom retractable completely within the outer limits of the tractor so that, when the tractor is not pulling an aircraft the manoeuvrable boom is retractable wholly within the outer limits of the ground handling tractor so that it is protected from damage.

Preferably the tractor includes a longitudinally extending tunnel and in which the manoeuvrable boom is received in its retracted position.

Preferably the manoeuvrable boom includes an articulated joint arranged between the connector and the remainder of the boom to allow the boom to be cranked in the horizontal plane to facilitate connection between the connector and the nosewheel assembly of an aircraft when the nosewheel assembly is not aligned with the tractor. Preferably the boom is connected to the ground handling tractor by a rotatable joint so that it is capable of being slewed and preferably it is also arranged to be luffed upwards and downwards in a vertical plane. The boom is preferably movable axially to extend and retract it into the operative position and, in addition it is preferred that the boom is telescopic so that its length is variable to enable it to adopt the correct attitude for particular aircraft.

Preferably all of the movement functions of the boom, its extension and retraction, movement of its articulated joint, its slewing and luffing functions, and its telescoping functions are all powered using, for example, motors or hydraulic piston and cylinder assemblies. In this case it is preferred that all of these functions of the manoeuvrable boom are arranged to be controlled from the driving cab of the ground handling tractor. It is also preferred that the ground handling tractor includes a separate, hand held control unit which enables all of the functions of the manoeuvrable boom to be controlled remotely from the driving cab so that, for example, an operator can control the final interconnection between the connector and the nosewheel assembly from an adjacent location.

Preferably the manoeuvrable boom includes load sensors to monitor the load and any turning torque applied by the boom to the aircraft nosewheel assembly. It is also preferred that the tractor includes means to provide a display responsive to the output of these load sensors. It is also preferred that the ground handling tractor includes a control system which compares the output of the load sensors with predetermined limits based on the type of aircraft being handled and which provides a warning if the loads applied through the boom to the aircraft exceed the predetermined limits. The control system may also inhibit the drive of the ground handling tractor automatically if such predetermined limits are exceeded to prevent the ground handling tractor imposing too great a load on the aircraft being handled.

Preferably the connector at the free end of the manoeuvrable boom is arranged to be as universal as possible in its application and thus is arranged to be able to couple to a wide variety of nosewheel assemblies. However, the connector assembly is preferably arranged to be interchangeable to enable it to be replaced, when necessary by the appropriate connector for a particular aircraft type.

A preferred example of ground handling tractor in accordance with this invention is thus arranged to be able to be connected to a wide variety of different aircraft having different types of connectors on their nosewheel assemblies and having these located at a range of different locations on the nosewheel assembly of the aircraft. The manoeuvrable boom provides a build-in tow-bar the location of the free end of which can be readily and easily adjusted to enable it to be coupled to the nosewheel of the aircraft and also enables the coupling and uncoupling operation to take place with only a single operator.

BRIEF DESCRIPTION OF THE DRAWINGS

A particular example of an aircraft ground handling tractor in accordance with this invention will now be described with reference to the accompanying drawings, in which:

FIG. 1A is a side elevation;
FIG. 1C is a rear elevation;
FIGS. 2A and 2B are a plan and a side elevation of the retractable towing boom, respectively;
FIGS. 3A, 3B and 3C are all plans of the knuckle joint illustrating its operation;
FIGS. 4A and 4B are side elevations of the connector illustrating its operation;
FIGS. 6A, 6B and 6C are a series of side elevations illustrating the retraction, extension and telescoping of the towing boom, respectively;
FIGS. 7A, 7B and 7C is a plan of the towing boom illustrating its slewing action; and,
FIGS. 8A, 8B and 8C is a series of side elevations illustrating the luffing action of the towing boom.

DESCRIPTION OF PREFERRED EXAMPLE

Figure 1B:
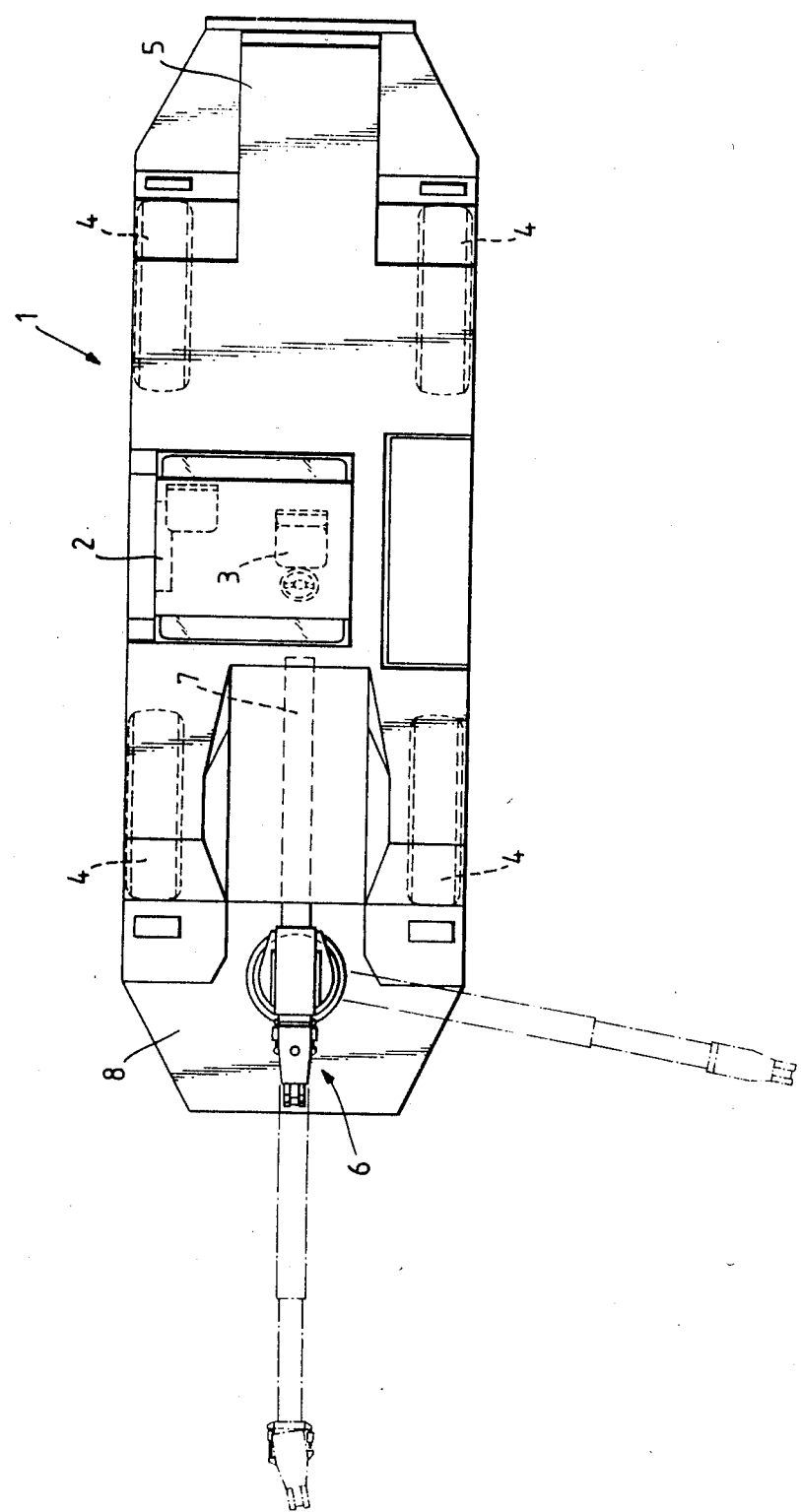
FIG. 1B is a plan.
Figure 5:
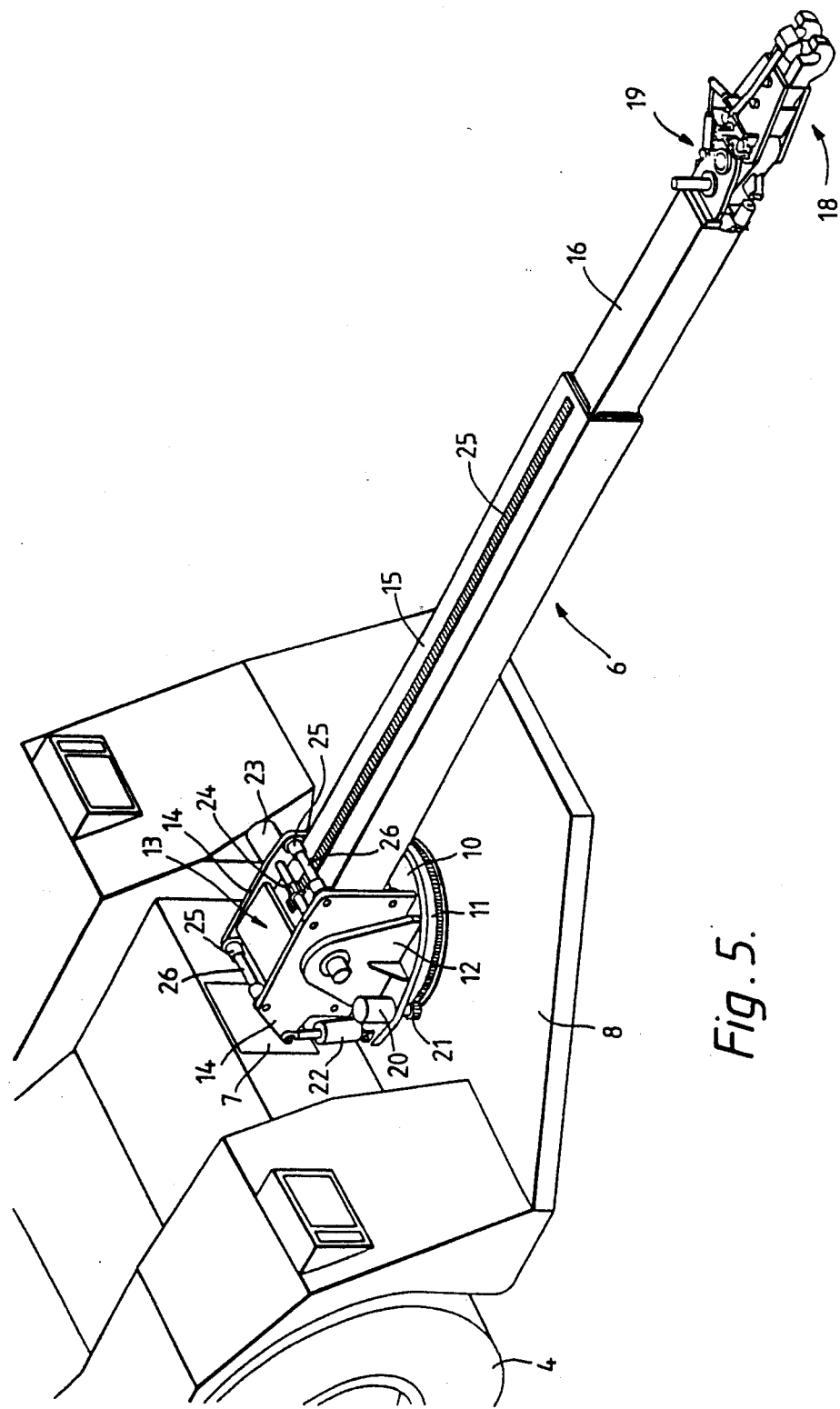
FIG. 5 is a perspective view of the rear of the tractor illustrating the towing boom in an extended position.

An aircraft ground handling tractor 1 includes a control cab 2 with a swivellable seat 3 and power and control assembly 3b, four wheels 4, a prime mover 5 located at the front of the tractor and a manoeuvrable towing boom 6 located at the rear of the tractor. Both rear wheels 4 are mechanically independent of each other and located on opposite sides of a retraction tunnel 7 which accommodates the boom 6 in its retracted position. In this example the wheels are all powered by independent hydraulic motors supplied from a central hydraulic pumping unit 5 supplying high pressure fluid to operate the motors connected to each of the driving wheels 4 and to operate the towing boom 6. However, the motors operating the driving wheels 4 may be electrically driven from a battery or from diesel electric power unit. Alternatively the drive may be coupled through shafts and gearboxes from a conventional diesel or gasoline engine. Only the front wheels 4 may be steerable or, alternatively, all four wheels may be steerable to increase the manoeuvrability of the tractor 1 still further. The tractor 1 includes a sub-chassis 8 at the rear end cantilevered outboard of the rear wheels 4. The retractable boom 6 is mounted on the sub-chassis 8.

The retractable towing boom 6 will be now described in more detail with reference to FIGS. 2 to 8. The boom 6 is mounted on a turntable 10 rotatably mounted on a slewing ring 11 fixed to the sub-chassis 8. The turntable 10 supports a pair of trunions 12, a collar 13 including a pair of side cheeks 14 is pivotally mounted on the trunions 12. A first boom section 15 slides within the collar 13. A second boom section 16 slides within the first section 15 to form a telescoping assembly. A connector head 18 is connected at the free end of the second section 16 via a knuckle joint 19. These will be described in more detail subsequently.

The turntable includes a motor 20 driving a pinion 21 meshed with the teeth of the slewing ring 11 so that rotation of the motor 20 controls the slewing of the boom 6. The slewing action of the boom 6 is illustrated more clearly in FIG. 7. Typically the boom 6 can be slewed through 160°, 80° each side of the longitudinal axis of the tractor. A pair of hydraulic piston and cylinder assemblies 22 are connected and act between the rear of the side cheeks 14 of the collar 13 and turntable 10. Actuation of these piston and cylinder assemblies luffs the towing boom 6 that is it causes it to pivot about the pivot formed between the trunions 12 and the side cheeks 14 to raise and lower the free end of the towing boom 6. This luffing action is illustrated in FIG. 8. The luffing movement of the boom 6 is typically limited to 12° in the vertical plane, ±6° with respect to the horizontal.

A motor 23 connected to one of the side cheeks 14 drives a pinion 24 which is meshed with a rack 25 extending along the first section 15 of the boom 6. Operation of the motor 23 causes extension and retraction of the first section 15 through the collar 13 and into and out of the tunnel 7 in the body of the tractor 1. Rollers 25 supported on axles 26 engage the upper and lower faces of the first section 15 to support the boom 15 as it moves backwards and forwards through the collar 13. The second section 16 slides within the first section 15 and is moved backwards and forwards by a double acting hydraulic piston and cylinder assembly 27. The retraction, extension and telescoping operation of the boom 6 is illustrated more clearly in FIG. 6.

The connector 18 at the free end of the towing boom 6 comprises a pair of lower hooks 30 and an upper pivoted jaw 31. The upper pivoted jaw 31 is connected via a pivoted link 32, and a bell crank 33 to a hydraulic piston and cylinder assembly 34 so that upon actuation of the hydraulic piston and cylinder assembly 34 the upper jaw is pivoted to open and close the connecting head 18. The connecting head 18 is arranged to be connected to a generally horizontally extending cylindrical rod forming part of the nosewheel assembly of an aircraft. Such a connection is commonly used. However, the connecting head 18 is connected to the free end of the boom 6 by a pair of pins 35 and, if required, the entire connecting head assembly can be replaced by removing the pins 35 with another connecting head assembly to fit a particular aircraft. The bell crank 33 can also be disconnected from the hydraulic piston and cylinder assembly 34 in this case. The connecting head also includes a longitudinal shear pin 36 and a radial shear pin 37 which, in response to an unacceptable longitudinal load or radial torque, shear to prevent an unacceptably high loading being applied to the nosewheel assembly of the aircraft.

The articulated knuckle joint 19 between the second section 16 of the extendable boom and the connecting head 18 includes a pin 40 about which two halves of the knuckle joint 19 pivot. Hydraulic piston and cylinder assemblies 41 and 42 on opposite sides of the pin 40 and arranged and acting between the two halves of the knuckle joint 19 cause it to pivot in the clockwise or anticlockwise direction in a horizontal plane. A hydraulically operated locking pin 43 can be engaged, when the two halves of the knuckle joint are aligned, to hold the knuckle joint into its aligned position. The pin 43 is moved up and down by a hydraulic piston and cylinder assembly 44 shown most clearly in FIG. 4. Operation of the knuckle joint is shown most clearly in FIG. 3 and shows how the orientation of the connecting head 18 can be cranked with respect to the remainder of the boom 6. In use, this enables the connecting head 18 to be aligned with the nosewheel assembly of an aircraft even when the location of the tractor 1 and turntable 10 prevents the towing boom 6 from being in direct alignment with the orientation of the nosewheel assembly. In such situations the first operation that is performed after the connecting head 18 has been connected to the nosewheel assembly is actuation of the hydraulic piston and cylinder assemblies 41 and 42 to align the two halves of the knuckle joint so that the nosewheel assembly of the aircraft is aligned with the towing boom before the tractor pulls or pushes the aircraft. Once the two halves of the knuckle joint have been aligned the hydraulic piston and cylinder assembly 44 is actuated to drive the locking pin 43 into place to lock the two halves of the knuckle joint in position.

The control cab 2 of the tractor 1 includes power and control assembly 3 to operate the motor 20 to control the slewing of the boom 6, the piston and cylinder assemblies 22 to control the luffing of the boom, the motor 23 to control the retraction and extension of the boom, the hydraulic piston and cylinder assembly 27 to control the telescoping of the boom, and also to control the operation of the piston and cylinder assemblies 41 and 42 to control the knuckle joint 19 and the hydraulic piston and cylinder assemblies 34 and 44 so that all of the movements of the extendible towing boom can be controlled from the cab 2 of the tractor 1. Typically these movements are all controlled by a joystick-type of control mechanism linked through a microprocessor control device to the various actuators. The tractor 1 also includes a second control system remote from the driving cab of the tractor 1 (shown schematically in FIG. 1A). Preferably this is a hand held control device 3a typically of the joystick type to enable the operator the stand away from the vehicle and, typically, adjacent the nosewheel assembly of the aircraft so that he has a clear view of the connecting head 18 whilst manoeuvring the connecting head and connecting it to the nosewheel assembly of the aircraft.

The pivot pin 40 and radial locking pin 43 preferably include load sensors 40a and 43a, respectively, such as electrical strain gauges to enable the longitudinal load and radial torque exerted by the towing boom on the nosewheel assembly of aircraft be monitored. These sensors 40a and 43a are shown schematically in FIGS. 2B, 4A, and 4B. The output of these load sensors is preferably displayed on a display device 40b mounted on the driving cab 2. The tractor 1 may include a programmed controller 40c which, in response to insertion of the appropriate aircraft type provides preset limits of longitudinal load for both pulling and pushing and radial torque and then monitors the output of the sensors to provide an audio and visual warning to the operator when these predetermined load settings are reached. The display device 40b and the programmed controller 40c are shown schematically in FIG. 1A. The predetermined load settings may be two stage so that, initially, at the lower load settings an audio visual warning is displayed to the driver whilst at the higher setting the programmed controller gives more serious warnings or automatically disables the drive of the tractor to prevent the nosewheel assembly of the aircraft being overloaded. The programmed controller may also include means for recording occasions upon which the operator exceeds the first predetermined limits and for recording the values of the loads imposed upon the aircraft. The programmed controller may also prevent the tractor being operated when it is disconnected from an aircraft until the towing boom 6 has been retracted into the tunnel 7 and prevent extension of the towing boom without the brakes of the tractor being locked on.

The motors 20 and hydraulic piston and cylinder assemblies 22 are preferably of the type which can be locked into position during manoeuvring of the boom 6 but which can also be allowed to freewheel and move in and out freely so that, during towing operations, as the tractor 1 turns relative to the aircraft the boom 6 pivots freely and the boom 6 luffs up and down freely to accommodate unevenness in the ground over which the aircraft is being pulled or pushed.

I claim:

1. In an aircraft ground handling tractor, a manoeuvrable boom having a free end and being mounted on said tractor, a connector means, capable of being connected to an aircraft nosewheel assembly being provided at said free end of said manoeuvrable boom for enabling said tractor to pull or push said aircraft in a substantially horizontal plane, the improvement wherein said manoeuvrable boom is retractable completely within outer limits of said tractor whereby when said tractor is not pulling said aircraft said manoeuvrable boom is retractable wholly within said outer limits of said tractor and is protected from damage.

2. The aircraft tractor of claim 1, wherein an articulated joint is arranged between said connector means and said boom to allow said manoeuvrable boom to be cranked in the horizontal plane to facilitate connection between said connector means and said nosewheel assembly of said aircraft when said nosewheel assembly is not aligned with said tractor.

3. The aircraft tractor of claim 1, wherein said boom is connected to said ground handling tractor by a joint whereby it is rotatable and capable of being slewed and whereby it is capable of being luffed upwards and downwards in a vertical plane.

4. The aircraft tractor of claim 3, wherein movement functions of said boom are all powered and all controlled from a driving cab of said ground handling tractor, and wherein said tractor includes a separate, hand held control unit which enables said movement functions also to be controlled remotely from said driving cab.

5. The aircraft tractor of claim 1, wherein said boom is movable axially to extend and retract it into an operative position and, wherein said boom is telescopic whereby its length is variable.

6. The aircraft tractor of claim 1, wherein said manoeuvrable boom includes load sensors to monitor load and turning torque applied by said boom to said aircraft nosewheel assembly.

7. The aircraft tractor according to claim 6, which also includes a control system operatively connected to said load sensors, and a warning device operatively connected to said control system, said control system comparing outputs of said load sensors with predetermined limits based on the type of aircraft being handled, said control system triggering said warning device if said loads applied through said boom to said aircraft exceed said predetermined limits.

8. The aircraft tractor of claim 1, wherein said connector means is interchangeable to enable it to be replaced, when necessary by an appropriate connector means for a particular aircraft type.

9. In an aircraft ground handling tractor, a manoeuvrable boom having a free end and being mounted on said tractor, a connector means, capable of being connected to an aircraft nosewheel assembly being provided at said free end of said manoeuvrable boom for enabling said tractor to pull or push said aircraft, the improvement wherein said manoeuvrable boom is retractable completely within outer limits of said tractor whereby when said tractor is not pulling said aircraft said manoeuvrable boom is retractable wholly within said outer limits of said tractor and is protected from damage, wherein said tractor includes a longitudinally extending tunnel, and wherein said manoeuvrable boom is received in said tunnel in its retracted position.

10. The aircraft tractor of claim 9, wherein said boom is connected to said ground handling tractor by a joint whereby it is rotatable and capable of being slewed and whereby it is capable of being luffed upwards and downwards in a vertical plane.

11. The aircraft tractor of claim 10, wherein said boom is movable axially to extend and retract it into an operative position and, wherein said boom is telescopic whereby its length is variable.

12. The aircraft tractor of claim 11, wherein movement functions of said boom are all powered and all controlled from a driving cab of said ground handling tractor, and wherein said tractor includes a separate, hand held control unit which enables said movement functions also to be controlled remotely from said driving cab.

13. The aircraft tractor of claim 12, wherein said manoeuvrable boom includes load sensors to monitor load and turning torque applied by said boom to said aircraft nosewheel assembly.

14. The aircraft tractor according to claim 13, which also includes a control system operatively connected to said load sensors, and a warning device operatively connected to said control system, said control system comparing outputs of said load sensors with predetermined limits based on the type of aircraft being handled, said control system triggering said warning device if said loads applied through said boom to said aircraft exceed said predetermined limits.

15. The aircraft tractor of claim 14, wherein said connector means is interchangeable to enable it to be replaced, when necessary by an appropriate connector means for a particular aircraft type.

* * * * *